(12) United States Patent
Im et al.

(10) Patent No.: US 11,682,398 B2
(45) Date of Patent: Jun. 20, 2023

(54) METHOD AND APPARATUS FOR RECOGNIZING SILENT SPEECH

(71) Applicant: INDUSTRY-UNIVERSITY COOPERATION FOUNDATION HANYANG UNIVERSITY, Seoul (KR)

(72) Inventors: Chang-Hwan Im, Seoul (KR); Jinuk Kwon, Seoul (KR); Younsoo Chae, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 214 days.

(21) Appl. No.: 17/099,676

(22) Filed: Nov. 16, 2020

(65) Prior Publication Data
US 2022/0084522 A1    Mar. 17, 2022

(30) Foreign Application Priority Data

Sep. 16, 2020    (KR) .................. 10-2020-0119368

(51) Int. Cl.
 *G10L 15/25*    (2013.01)
 *G10L 15/16*    (2006.01)
 *G06F 3/01*    (2006.01)
(52) U.S. Cl.
 CPC .............. *G10L 15/25* (2013.01); *G06F 3/011* (2013.01); *G10L 15/16* (2013.01)

(58) Field of Classification Search
 CPC ....... G10L 15/25; G10L 15/16; G10L 15/063; G06F 3/011; G06F 3/017; G06K 9/00536;
 (Continued)

(56) References Cited

U.S. PATENT DOCUMENTS 6,006,175 A * 12/1999 Holzrichter .......... A61B 5/0507
    704/E15.041
9,424,842 B2    8/2016 Liu et al.
(Continued)

FOREIGN PATENT DOCUMENTS

JP    6484317 B2    3/2019
JP    2019204147 A    11/2019
(Continued)

OTHER PUBLICATIONS

Kwon J. et al., "Development of Silent Speech Interface by Accelerometer" Summer Annual Conference of IEIE, Aug. 2020, 3 pages (English Abstract Only).
(Continued)

*Primary Examiner* — Fariba Sirjani
(74) *Attorney, Agent, or Firm* — Steinfl + Bruno LLP (57) ABSTRACT

An electronic apparatus includes: a communication device configured to receive a signal from each of a plurality of acceleration sensors attached to a face of a user; a memory configured to store a classification learning model that classifies words based on a plurality of sensor output values; and a processor configured to determine a word corresponding to a mouth shape of the user by input a value of the received signal to the classification learning model, when the signal is received from each of the plurality of acceleration sensors.

13 Claims, 6 Drawing Sheets

(58) Field of Classification Search
CPC .. G06K 9/6271; G06N 3/0445; G06N 3/0454; G06N 3/08; G01P 15/18
See application file for complete search history.

(56) References Cited

U.S. PATENT DOCUMENTS

| | | | |
|---|---|---|---|
| 10,621,973 B1* | 4/2020 | McVicker | H04R 1/14 |
| 2010/0131268 A1* | 5/2010 | Moeller | G10L 21/0364 |
| | | | 704/E15.039 |
| 2012/0053931 A1* | 3/2012 | Holzrichter | H04R 3/002 |
| | | | 704/E19.001 |
| 2012/0075184 A1* | 3/2012 | Madhvanath | G10L 15/24 |
| | | | 345/161 |
| 2016/0378193 A1* | 12/2016 | Camacho Perez | G06F 3/017 |
| | | | 345/156 |
| 2017/0069306 A1* | 3/2017 | Asaei | G10L 19/0018 |
| 2017/0263237 A1* | 9/2017 | Green | G10L 13/04 |
| 2018/0164879 A1* | 6/2018 | Moffat | G06F 3/011 |
| 2019/0189145 A1* | 6/2019 | Rakshit | G06F 40/58 |
| 2020/0234712 A1* | 7/2020 | Epstein | G10L 15/063 |
| 2020/0357382 A1* | 11/2020 | Ogawa | G06N 3/02 |
| 2021/0134062 A1* | 5/2021 | Joseph | G06T 19/006 |
| 2021/0174783 A1* | 6/2021 | Wieman | G10L 15/16 |
| 2022/0208194 A1* | 6/2022 | Rameau | A61B 5/256 |
| 2022/0327956 A1* | 10/2022 | Butler | G10L 15/187 |

FOREIGN PATENT DOCUMENTS

| | | |
|---|---|---|
| KR | 102071421 B1 | 1/2020 |
| KR | 20200023855 A | 3/2020 |

OTHER PUBLICATIONS

Denby B. et al. "Silent speech interfaces", *Speech Communication*, vol. 52, Issue 4. Apr. 2010. pp. 270-287. 18 Pages, https://doi.org/10.1016/j.specom.2009.08.002.

Han, G.C., "Gait Analysis and Postural Test Using Acceleration Sensor," *Research in Vestibular Science* vol. 11, Suppl. 1. Jun. 2012. pp. S52-S59. KR Original + English Abstract. 8 Pages.

Notice of Preliminary Rejection for Korean Application No. 10-2020-0119368 filed on Sep. 16, 2020, on behalf of Industry University Cooperation Foundation Hanyang University, dated Oct. 25, 2021. KR Original + English Translation. 7 Pages.

* cited by examiner

METHOD AND APPARATUS FOR RECOGNIZING SILENT SPEECH

CROSS-REFERENCE TO RELATED APPLICATION(S)

This application is based on and claims priority under 35 U.S.C. § 119 to Korean Patent Application No. 10-2020-0119368, filed on Sep. 16, 2020, in the Korean Intellectual Property Office, the disclosure of which is incorporated by reference herein in its entirety.

BACKGROUND OF THE INVENTION

Field of the Invention

Apparatuses and methods consistent with the disclosure relate to a method and apparatus for recognizing silent speech, and more particularly, to a method and apparatus capable of recognizing silent speech of a user by using an acceleration sensor.

Description of the Related Art

A speech recognition technology is a technology of converting a signal obtained by a computer through a sound sensor such as a microphone into a word or sentence. Recently, with the development of the speech recognition technology, provision of various services only with user speech has become possible.

However, it is difficult to use the speech recognition technology in an environment in which sound cannot be made, such as a wartime situation or underwater environment, and it is also difficult for users who have difficulty in vocalization to use the speech recognition technology.

Therefore, recently, a study on silent speech for recognition and synthesis of speech only using mouth movements without a speech sound has been actively conducted.

In the existing silent speech study, facial electromyogram (fEMG) that measures a tiny electrical signal generated by facial muscles is used. However, the facial electromyogram requires multiple electrodes for signal processing, and the quality of signal varies depending on a state of a surface of the face and a use time due to the characteristic of the electrode. Therefore, performance varies depending on the surrounding environment, which is problematic.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a method and apparatus capable of recognizing silent speech of a user by using an acceleration sensor.

According to an embodiment of the disclosure, an electronic apparatus includes: a communication device configured to receive a signal from each of a plurality of acceleration sensors attached to a face of a user; a memory configured to store a classification learning model that classifies words based on a plurality of sensor output values; and a processor configured to determine a word corresponding to a mouth shape of the user by input a value of the received signal to the classification learning model, when the signal is received from each of the plurality of acceleration sensors.

The classification learning model may be a model trained by using the value of the signal received from each of the plurality of acceleration sensors in a process of uttering each of a plurality of predetermined words.

The classification learning model may be a convolutional neural network-long short-term memory (1D CNN-LSTM) model.

The plurality of acceleration sensors may be attached to different portions around a mouth that move the most at the time of speech utterance of the user.

The plurality of acceleration sensors may include three to five acceleration sensors.

Each of the plurality of acceleration sensors may be a 3-axis accelerometer.

The processor may perform an operation corresponding to the determined word.

According to another embodiment of the disclosure, a method for recognizing silent speech includes: receiving a signal from each of a plurality of acceleration sensors attached to a face of a user; determining a word corresponding to a mouth shape of the user by input a value of the received signal to a classification learning model that classifies a word based on a plurality of sensor output values.

The method may further include training the classification learning model by using the value of the signal received from each of the plurality of acceleration sensors in a process of uttering each of a plurality of predetermined words.

The classification learning model may be a convolutional neural network-long short-term memory (1D CNN-LSTM) model.

In the receiving, the signal may be received from each of the plurality of acceleration sensors attached to different portions around a mouth that move the most at the time of speech utterance of the user.

The plurality of acceleration sensors may include three to five acceleration sensors.

The method may further include performing an operation corresponding to the determined word.

According to still another embodiment of the disclosure, in a computer-readable recording medium including a program for performing a method for recognizing silent speech, the method includes: receiving a signal from each of a plurality of acceleration sensors attached to a face of a user; and determining a word corresponding to a mouth shape of the user by input a value of the received signal to a classification learning model that classifies a word based on a plurality of sensor output values.

According to the embodiments of the disclosure, it is possible to recognize silent speech of the user by using the acceleration sensor. Further, because the acceleration sensor is used, it is possible to recognize silent speech even in an extreme environment such as a wartime situation or underwater environment.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other embodiments of the disclosure will be more apparent by describing certain embodiments of the disclosure with reference to the accompanying drawings, in which.

DETAILED DESCRIPTION OF THE EXEMPLARY EMBODIMENTS

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined based on the meaning of the terms and the contents throughout the disclosure rather than simple names of the terms.

Since the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. In a case where it is decided that a detailed description for the known art related to the disclosure may obscure the gist of the disclosure, the detailed description will be omitted.

Terms "first", "second", and the like, may be used to describe various components, but the components should not be construed as being limited by these terms. The terms are used only to distinguish one component from another component.

Singular forms used herein are intended to include plural forms unless context explicitly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In embodiments of the disclosure, a "module" or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor except for a "module" or a "-er/or" that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted to obviously describe the disclosure, and similar reference numerals will be used to describe similar portions throughout the specification.

Hereinafter, the disclosure will be described in detail with reference to the drawings.

Figure 1:
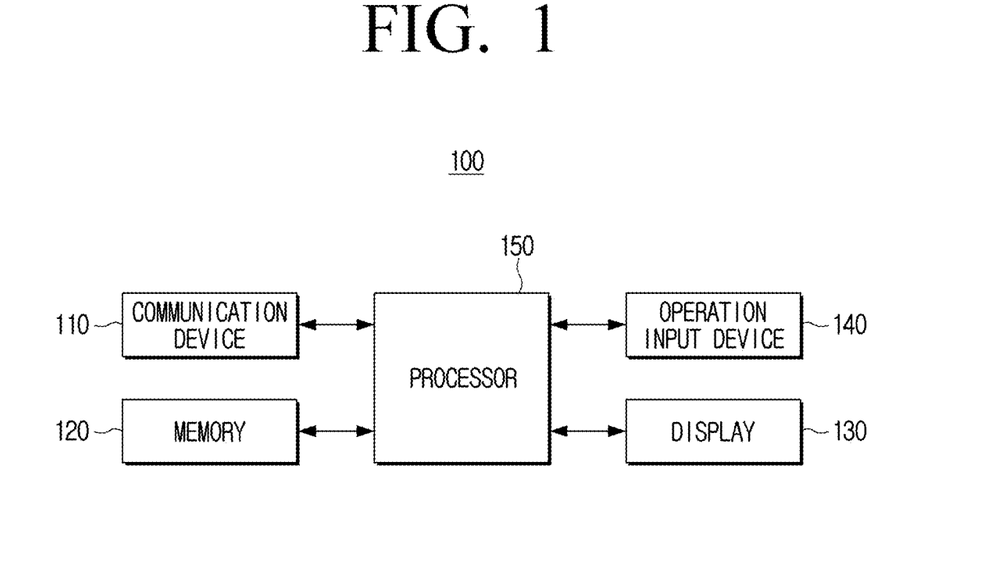
FIG. 1 is a block diagram for describing a configuration of an electronic apparatus according to an embodiment of the disclosure.

FIG. 1 is a block diagram for describing a configuration of an electronic apparatus according to an embodiment of the disclosure.

Referring to FIG. 1, an electronic apparatus 100 may include a communication device 110, a memory 120, a display 130, an operation input device 140, and a processor 150. Here, the electronic apparatus 100 may be a personal computer (PC) capable of performing image processing, a notebook PC, a smartphone, a server, or the like.

The communication device 110 is configured to connect the electronic apparatus 100 to an external apparatus, and not only connection to a mobile device through a local area network (LAN) and the Internet, but also connection through a universal serial bus (USB) port may be possible.

Further, the communication device 110 may receive a signal from a plurality of acceleration sensors. Specifically, the communication device 110 may receive, from each acceleration sensor, movement information (specifically, acceleration information) in three axial directions. Here, the communication device 110 may individually receive a signal by performing communication with each of the plurality of acceleration sensors, or may receive a signal from one (specifically, a device that collects signals from the plurality of acceleration sensors and provides the signals to an external apparatus) of the plurality of acceleration sensors.

Here, the acceleration sensor is a detector that measures the acceleration of a moving object or the intensity of an impact, and a 3-axis acceleration sensor capable of measuring acceleration in three axial directions may be used as the acceleration sensor used in the disclosure. Such an acceleration sensor may be attached to a portion around the mouth of the user. Here, a position where the acceleration sensor is attached may be a portion of the face that moves the most at the time of utterance, which may be determined by using a motion capture method. A specific attachment position will be described later with reference to FIG. 2.

The communication device 110 may not only be connected to another electronic apparatus in a wired manner, but also be connected to another electronic apparatus via a router or sharer connected to the public Internet. Further, the communication device 110 may be connected to the router or sharer not only in a wired manner, but also in a wireless manner such as wireless fidelity (Wi-Fi), Bluetooth, or cellular communication.

Further, the communication device 110 may transmit, to an external apparatus, a word recognized in a process to be described later, information on an event corresponding to the recognized word, and the like. For example, in a case where the event corresponding to the recognized word is an event of controlling an external apparatus, the communication apparatus 110 may transmit, to the external apparatus, information (or control signal) for controlling the external apparatus.

The memory 120 is a component for storing an operating system (O/S) for driving the electronic apparatus 100 or software, data, and the like for training a classification learning model. The memory 120 may be implemented in various forms such as a random access memory (RAM), a read only memory (ROM), a flash memory, a hard disk drive (HDD), an external memory, and a memory card, and is not limited to any one of them.

Here, the classification learning model is a model trained using a value of a signal received from each of the plurality of acceleration sensors in a process of uttering each of a plurality of words, and may be a convolutional neural network-long short-term memory (1D CNN-LSTM) model. A specific configuration and learning operation of the classification learning model will be described later with reference to FIGS. 2 to 3.

The memory 120 may store a plurality of recognizable word information. Further, the memory 120 may store information on an event corresponding to each of the plurality of words, or information on an operation to be performed in the electronic apparatus 100. For example, one of the plurality of words may be "music", and an event (or operation) of playing a pre-stored music may be mapped to the word "music" and stored in the memory 120.

The display 130 displays a user interface window for receiving a selection of a function supported by the electronic apparatus 100. Specifically, the display 130 may display a user interface window for receiving a selection of various functions provided by the electronic apparatus 100. Such a display 130 may be a monitor such as a liquid crystal display (LCD), a cathode-ray tube (CRT) display, or an organic light emitting diode (OLED) display, and may also be implemented by a touch screen that may also perform a function of the operation input device 140 to be described later.

The display 130 may display a guide image for training the classification learning model. For example, the display 130 may display a guide image that sequentially shows words for learning by using the plurality of word information stored in the memory 120.

Further, the display 130 may display a word corresponding to recognized silent speech or display a video according to an operation corresponding to a recognized word. For example, in a case where a word "picture" is recognized in a silent speech recognition process, the display 130 may display a pre-stored picture.

The operation input device 140 may receive, from the user, a selection of a function of the electronic apparatus 100, and a control command for the function. Specifically, the operation input device 140 may receive a learning command, information on a word to be learned, information on an event corresponding to the learned word, and the like.

The processor 150 may perform a control for each component in the electronic apparatus 100. Specifically, once a booting command is input from the user, the processor 150 may perform booting by using the operating system stored in the memory 120. Such a processor 150 may be implemented by a single device such as a central processing unit (CPU) or an application-specific integrated circuit (ASIC), or may be implemented by a plurality of devices such as a CPU and a graphics processing unit (GPU).

The processor 150 may train the classification learning model. Specifically, the processor 150 may train the classification learning model by using a value of a signal received from each of the plurality of acceleration sensors, respectively, in a process of uttering each of a plurality of predetermined words. Here, the processor 150 may train the classification learning model by using a repetitive signal value of the acceleration sensor for one word to improve accuracy.

Meanwhile, the learning model may be a model specialized for one user, or may be a model applied to a plurality of users. For example, in a case where the learning model is a model applied to a plurality of users, the classification learning model may be trained by using a value of a signal received from the acceleration sensor attached to each of various users. Meanwhile, although a case where the electronic apparatus 100 directly trains the learning model has been described in the disclosure, in actual implementation, another electronic apparatus 100 may train the classification learning model, or may receive and use a classification learning model trained in another electronic apparatus 100.

Further, the processor 150 may determine a silent speech section. For example, because the acceleration sensor is attached onto the face (specifically, a portion around the mouth), the signal value may be changed even in a case where silent speech is not made (for example, a case where a facial expression of the user changes or a case of eating foods). Therefore, the processor 150 may determine, as a section in which silent speech recognition is to be performed, a section corresponding to silent speech, such as a section in which a value of a signal output from the acceleration sensor is a predetermined value or more, a section in which a value of a signal output from the acceleration sensor is changed multiple times within a predetermined time, or the like. Meanwhile, in actual implementation, such a silent speech section may also be determined by using the learning model. Further, in actual implementation, a timing when user utterance is made by using a microphone may be used.

The processor 150 may generate a plurality of information sets by using a signal provided from each of the plurality of acceleration sensors. For example, in a case where the acceleration sensor is a 3-axis acceleration sensor, and five acceleration sensors are used, the processor 150 may generate 15 (3*5) information sets in the silent speech section.

Further, the processor 150 may proactively perform signal processing for a signal received from the acceleration sensor. For example, because signals output from a plurality of acceleration sensors may have different intensities and a signal value that is out of an output range of the acceleration sensor used at the time of learning may be output, the processor 150 may perform normalization processing for making a plurality of acceleration sensors have signal values within the same signal range. Meanwhile, such signal processing may also be performed by the communication device, rather than the processor 150.

Further, the processor 150 inputs a value of the received signal to the classification learning model to determine a word corresponding to the mouth shape of the user. Specifically, the processor 150 may input the information set generated in the previous process to the classification learning model, and determine, as the word corresponding to the mouth shape, a word output from softmax of the classification learning model.

Further, the processor 150 may perform an event or operation corresponding to the determined word. For example, in a case where an event of playing music corresponds to the word "music", the processor 150 may perform an operation of playing music in a case where the determined word is music.

As described above, the electronic apparatus 100 according to the disclosure may recognize silent speech of the user by using the acceleration sensor. Further, because the acceleration sensor is used, it is possible to recognize silent speech even in an extreme environment such as a wartime situation or underwater environment. Further, because the acceleration sensor is used in the disclosure, that is, utterance is recognized by sensing movement of muscles that directly affect utterance, higher accuracy may be achieved as compared with a method in which utterance is recognized by sensing electricity flowing in muscles.

Meanwhile, although a case where the electronic apparatus 100 includes multiples components has been illustrated and described in FIG. 1, some of the illustrated components may be omitted in actual implementation. Further, although a case where the acceleration sensor is not included in the electronic apparatus 100 has been illustrated and described in FIG. 1, the plurality of acceleration sensors may be components of the electronic apparatus 100.

Figure 2:
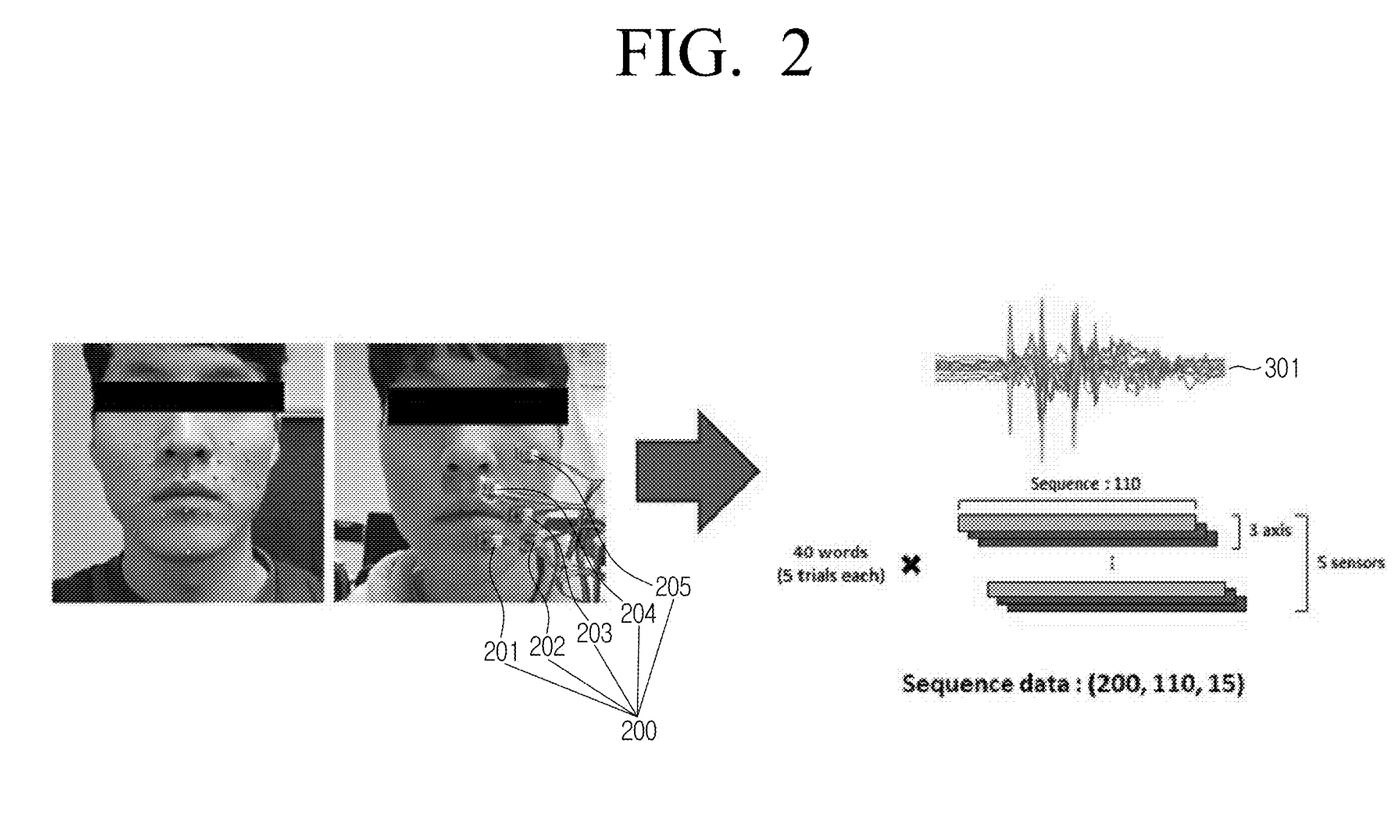
FIG. 2 is a diagram for describing a position where an acceleration sensor according to the disclosure is attached.

FIG. 2 is a diagram for describing a position where the acceleration sensor according to the disclosure is attached.

Referring to FIG. 2, first, a portion of the face to which the acceleration sensor is to be attached may be determined. Specifically, three to five portions of the face that move the most in a facial area of the user at the time of utterance may be selected by using a motion capture technology. Such a motion capture technology may be applied to the electronic apparatus 100 described in FIG. 1, and may also be applied to another apparatus. In a case where the motion capture technology is applied to the electronic apparatus 100 of FIG. 1, the electronic apparatus 100 may include a camera that may capture an image of the face of the user, or may receive a captured image from a camera through the communication device 110.

Further, the acceleration sensor is attached to the determined portion of the face, and each of predetermined words may be uttered multiple times in this state, thereby training the classification learning model.

In the experiment, five 3-axis accelerometers (MPU-9250, 50 Hz) that satisfy sensitivity for measuring a minute movement of the mouth were used, 40 everyday words were selected for an AI speaker, and movements of portions around the mouth were measured by using the acceleration sensors while total five subjects repeatedly utter each word five times.

Although FIG. 2 illustrates a case where five acceleration sensors are connected in a wired manner, the acceleration sensor may also perform communication with the electronic apparatus 100 in a wireless communication manner. Further, although FIG. 2 illustrates a case where five acceleration sensors are individually attached to the face, in actual implementation, five acceleration sensors may be arranged on one sheet and the sheet may be attached to the face.

Further, although FIG. 2 illustrates an example in which five acceleration sensors are used, in actual implementation, only three or four acceleration sensors may be used.

Figure 3:
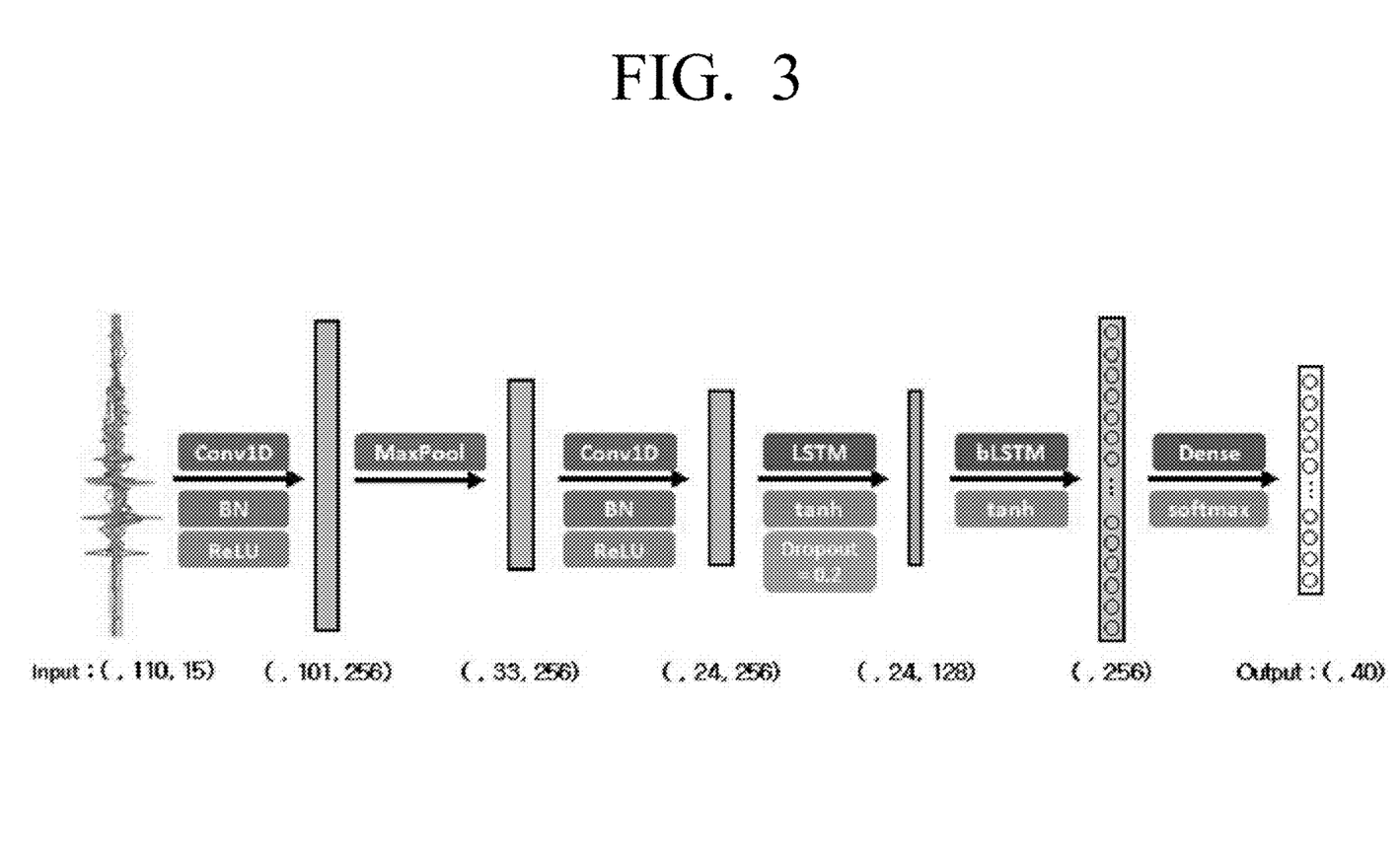
FIG. 3 is a diagram for describing an operation of a learning model according to an embodiment of the disclosure.

FIG. 3 is a diagram for describing an operation of the learning model according to an embodiment of the disclosure.

Referring to FIG. 3, the learning model according to the disclosure may include a plurality of layers, and the first layer may receive acceleration information received through the acceleration sensor.

Further, a word corresponding to the received acceleration information may be output by using softmax at an end of the layers. Here, as the learning model, a convolutional neural network-long short-term memory (1D CCN-LSTM) model, which is a deep learning model known as being able to classify time series data well, may be used, but the learning model is not limited thereto. That is, a deep learning model other than the deep learning model described above may also be used.

Figure 4:
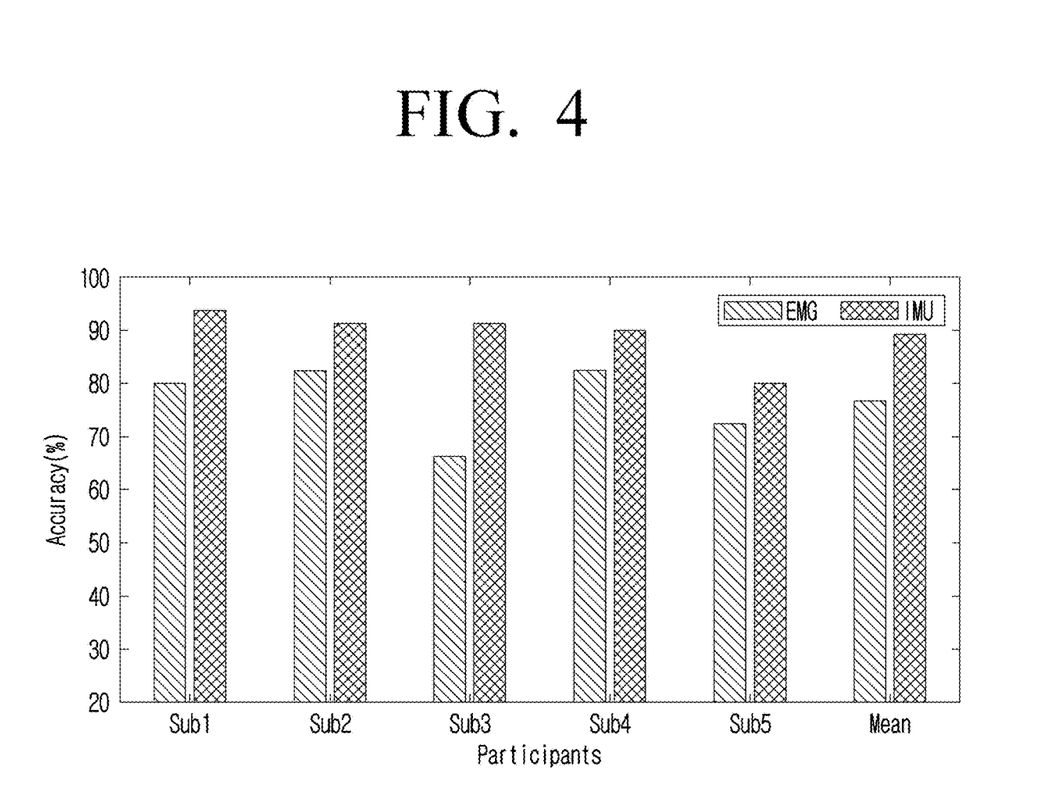
FIG. 4 is a diagram illustrating comparison of accuracy between a method using facial electromyogram and a method using an acceleration sensor.

FIG. 4 is a diagram illustrating comparison of accuracy between a method using facial electromyogram (fEMG) and a method using the acceleration sensor. Specifically, FIG. 4 is a diagram illustrating comparison between classification accuracy when using fEMG of six channels and classification accuracy when using five acceleration sensors.

Referring to FIG. 4, it may be appreciated that the method using the fEMG for 40 words has accuracy of 76.75%, and the method using the acceleration sensor has accuracy of 89.25%. In addition, it may be appreciated that the method using the acceleration sensor has a higher accuracy despite the use of less channels as compared with the method using the fEMG.

Figure 5:
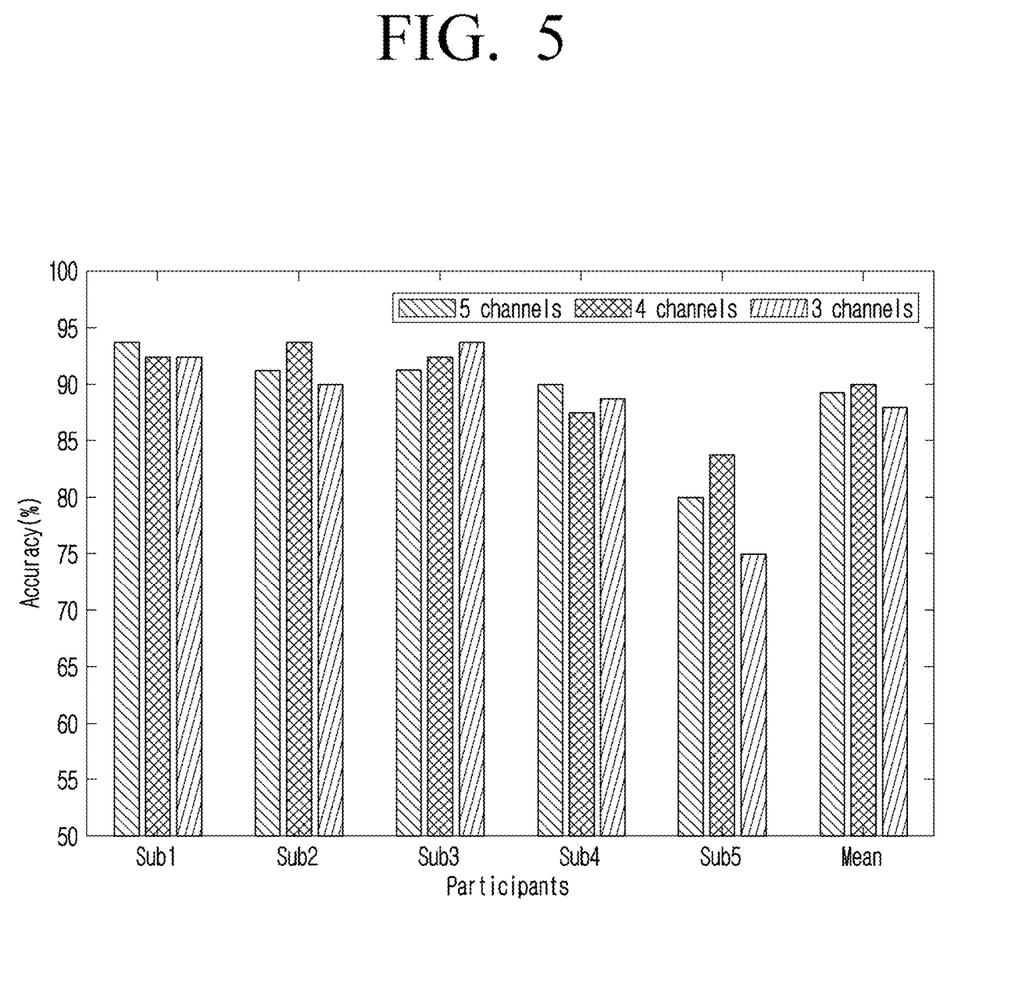
FIG. 5 is a diagram illustrating comparison of accuracy according to the number of acceleration sensors.

FIG. 5 is a diagram illustrating comparison of accuracy according to the number of acceleration sensors. Specifically, FIG. 5 is a diagram illustrating comparison of classification accuracy between a case where all the five acceleration sensors are used and a case where a different number of acceleration sensors are used and positions of the acceleration sensors are changed.

Referring to FIG. 5, it may be appreciated that an average accuracy of 89.25% is achieved in a case where all the five acceleration sensors are used, an average accuracy of 90% is achieved in a case where only four acceleration sensors are used, and an average accuracy of 88% is achieved in a case where three acceleration sensors are used. That is, it may be appreciated that performance sufficient to classify 40 words may be achieved even in a case where only three acceleration sensors are used.

Meanwhile, in a case where the number of words to be recognized is increased, or an environment in which measurement of silent speech is performed is changed, classification accuracy may be changed. Therefore, the number of acceleration sensors described above may be other than three to five according to the number of words to be recognized or the environment. Further, the position of the acceleration sensor may also be appropriately changed according to the number of words to be recognized or the environment.

Meanwhile, although FIGS. 4 and 5 illustrate a case where only words are recognized, in actual implementation, extension may be made in such a manner as to recognize a phrase by continuously performing the above-described recognition operation.

Figure 6:
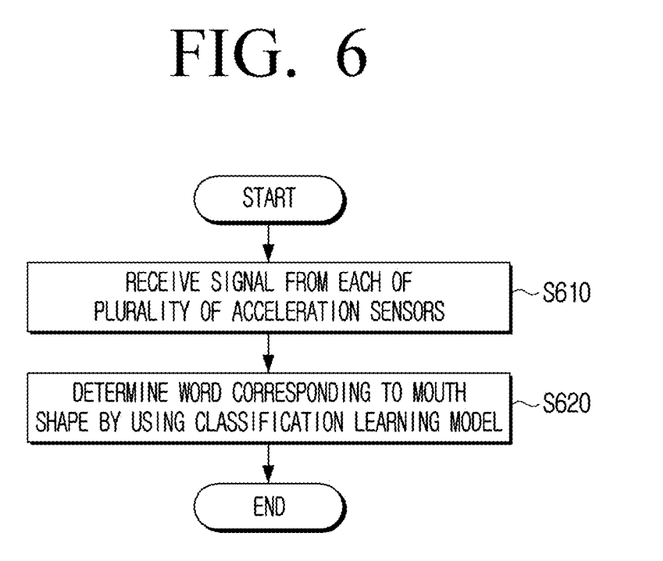
FIG. 6 is a flowchart for describing a method for recognizing silent speech according to an embodiment of the disclosure.

FIG. 6 is a flowchart for describing a method for recognizing silent speech according to an embodiment of the disclosure.

Referring to FIG. 6, first, a signal is received from each of a plurality of acceleration sensors attached to a face of a user (S610). Here, the plurality of acceleration sensors may be attached to different portions around a mouth that move the most at the time of speech utterance of the user.

Further, a value of the received signal is input to the classification learning model that classifies a word based on a plurality of sensor output values to determine a word corresponding to a mouth shape (or silent speech) of the user (S620).

Meanwhile, before the determination described above, the classification learning model may be proactively trained by using the value of the signal received from each of the plurality of acceleration sensors in a process of uttering each of a plurality of predetermined words.

Once the word is determined, an operation corresponding to the determined word may be performed. For example, the recognized word may be displayed or an event corresponding to the recognized word may be performed.

As described above, the method for recognizing silent speech according to the disclosure may recognize silent speech of the user by using the acceleration sensor. Further, because the acceleration sensor is used, it is possible to recognize silent speech even in an extreme environment such as a wartime situation or underwater environment. The method for recognizing silent speech as illustrated in FIG. 6 may be performed on the electronic apparatus having the configuration of FIG. 1, and may also be performed on an electronic apparatus having other configurations.

Further, the method for recognizing silent speech as described above may be implemented as a program including an algorithm executable by a computer, and the above-described program may be stored in a non-transitory computer readable medium and provided.

The non-transitory readable medium means a medium that semi-permanently stores data and is readable by a device, not a medium that stores data for a short period of time such as a register, a cache, a memory, or the like. Specifically, programs for performing various methods described above may be provided in a state of being stored in a non-transitory computer readable medium such as a compact disk (CD), a digital versatile disk (DVD), a hard disk, a Blu-ray disk, a universal serial bus (USB), a memory card, or a read only memory (ROM).

Although the embodiments have been described above with specific examples and drawings, various modifications and changes may be made by those having ordinary skill in the art. For example, suitable results may be achieved even if the described technologies are performed in a different order, and/or components such as the system, structure, device, and circuit described above are coupled or combined in a manner different from that described above, or are replaced or substituted by other components or their equivalents.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
a communication device configured to receive a signal from each of a plurality of acceleration sensors attached to a face of a user, wherein the plurality of acceleration sensors are attached to different portions around a mouth of the user, the different portions being those that move the most at the time of speech utterance of the user;
a memory configured to store a classification learning model that classifies a word based on a plurality of sensor output values; and
a processor configured to determine a word corresponding to a mouth shape of the user by inputting signal values of the received signal into the classification learning model, when the signal values are received from each of the plurality of acceleration sensors.

2. The electronic apparatus as claimed in claim 1, wherein the classification learning model is a model trained by using the value of the signal received from each of the plurality of acceleration sensors in a process of uttering each of a plurality of predetermined words.

3. The electronic apparatus as claimed in claim 1, wherein the classification learning model is a convolutional neural network-long short-term memory (1D CNN-LSTM) model.

4. The electronic apparatus as claimed in claim 1, wherein the plurality of acceleration sensors include three to five acceleration sensors.

5. The electronic apparatus as claimed in claim 1, wherein each of the plurality of acceleration sensors is a 3-axis accelerometer.

6. The electronic apparatus as claimed in claim 1, wherein the processor is configured to perform an operation corresponding to the determined word.

7. A method for recognizing silent speech, the method comprising:
receiving a signal from each of a plurality of acceleration sensors attached to a face of a user, wherein the plurality of acceleration sensors are attached to different portions around a mouth of the user, the different portions being those that move the most at the time of speech utterance of the user; and
determining a word corresponding to a mouth shape of the user by inputting signal values of the received signal into a classification learning model that classifies a word based on a plurality of sensor output values.

8. The method as claimed in claim 7, further comprising training the classification learning model by using the value of the signal received from each of the plurality of acceleration sensors in a process of uttering each of a plurality of predetermined words.

9. The method as claimed in claim 7, wherein the classification learning model is a convolutional neural network-long short-term memory (1D CNN-LSTM) model.

10. The method as claimed in claim 7, wherein in the receiving, the signal is received from each of the plurality of acceleration sensors attached to different portions around a mouth that move the most at the time of speech utterance of the user.

11. The method as claimed in claim 10, wherein the plurality of acceleration sensors include three to five acceleration sensors.

12. The method as claimed in claim 7, further comprising performing an operation corresponding to the determined word.

13. A non-transitory computer-readable recording medium including a program for performing a method for recognizing silent speech, the method including:
receiving a signal from each of a plurality of acceleration sensors attached to a face of a user, wherein the plurality of acceleration sensors are attached to different portions around a mouth of the user, the different portions being those that move the most at the time of speech utterance of the user; and
determining a word corresponding to a mouth shape of the user by inputting signal values of the received signal into a classification learning model that classifies a word based on a plurality of sensor output values.

* * * * *